United States Patent
Bos et al.

(10) Patent No.: US 6,788,956 B2
(45) Date of Patent: *Sep. 7, 2004

(54) TERMINAL TO EXECUTE A TERMINAL APPLICATION

(75) Inventors: Lieve Maria Marcella Rosemarijn Bos, Sint Niklaas (BE); Marco Johannes Hubertus Peters, Ns Bergen Op Zoom (NL)

(73) Assignee: Alcatel, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/247,621

(22) Filed: Sep. 20, 2002

(65) Prior Publication Data

US 2003/0017841 A1 Jan. 23, 2003

Related U.S. Application Data

(63) Continuation of application No. 09/468,227, filed on Dec. 20, 1999, now Pat. No. 6,456,857.

(30) Foreign Application Priority Data

Dec. 6, 1999 (EP) .......................................... 99403045

(51) Int. Cl.$^7$ ................................................ H04M 1/00
(52) U.S. Cl. ..................... 455/550.1; 370/466; 370/467
(58) Field of Search ............................. 455/414.1, 445, 455/466, 550.1, 552.1; 370/466–469; 709/250

(56) References Cited

U.S. PATENT DOCUMENTS

| | | | | | |
|---|---|---|---|---|---|
| 5,568,487 A | * | 10/1996 | Sitbon et al. | ................ | 370/466 |
| 5,577,042 A | * | 11/1996 | McGraw et al. | ............ | 370/257 |
| 5,719,918 A | * | 2/1998 | Serbetciouglu et al. | ...... | 380/271 |
| 5,946,634 A | * | 8/1999 | Korpela | .................... | 455/552.1 |
| 6,011,803 A | * | 1/2000 | Bicknell et al. | ............ | 370/467 |
| 6,192,414 B1 | * | 2/2001 | Horn | .......................... | 709/239 |
| 6,385,193 B1 | * | 5/2002 | Civanlar et al. | ............ | 370/352 |
| 6,456,857 B1 | * | 9/2002 | Bos et al. | ................ | 455/550.1 |
| 6,463,056 B1 | * | 10/2002 | Silva et al. | .................. | 370/356 |

OTHER PUBLICATIONS

"3$^{rd}$ Generation Partnership Project; Technical Specification Group Service and System Aspects; Virtual Home Environment/Open Service Architecture (3G TS 23.127 v.0.3.00.2.1)", GPP Technical Specifications, Oct. 1999, XP002137810.

F. Anjum et al, "ChaiTime: a system for rapid creation of portable next–generation telephony services using third–party software components", Open Architectures and Network Programming Proceedings, 1999, OPENARCH '99, Mar. 27, 1999, pp. 22–31, XP002137811.

3G TS 23.127 1.0.0 (Oct. 1999)—Technical Specification —3$^{rd}$ Generation Partnership Project; Technical Specifciation Gorup Services and System Aspects; Virtual Home Environment/ Open Service Architecture.

* cited by examiner

Primary Examiner—Vivian Chin
Assistant Examiner—Tuan Tran
(74) Attorney, Agent, or Firm—Sughrue Mion, PLLC

(57) ABSTRACT

A terminal for use in a communication network having several terminal capability functions for realizing a multitude of terminal capability features. A terminal application execution apparatus is coupled to the terminal capability functions to interact with the terminal capability functions and to execute thereby a terminal application. The terminal includes at least one terminal capability server coupled between the terminal application execution apparatus and to the terminal capability functions. The terminal capability server translates a first application signal received from at least one of the terminal capability functions into a first predefined application open signal and provides the translated signal to the terminal application execution apparatus. The terminal capability server translates a second predefined application open signal received from the terminal application execution apparatus into a second application signal and provides the translated signal to at least one of the terminal capability functions.

8 Claims, 1 Drawing Sheet

TERMINAL TO EXECUTE A TERMINAL APPLICATION

This is a continuation of application Ser. No. 09/468,227 filed Dec. 20, 1999; now U.S. Pat. No. 6,456,857, the disclosure of which is incorporated herein by reference.

BACKGROUND OF THE INVENTION

The present invention relates to a terminal for use in a communication network and comprising a plurality of terminal capability functions to realize a plurality of terminal capability features and coupled thereto a terminal application execution apparatus to interact with one or more of the plurality of terminal capability functions and to execute thereby a terminal application, the terminal application to be executed by such a terminal, a carrier of such a terminal application, a method realized by such a terminal, and a communication network comprising such a terminal.

Such a terminal with terminal capabilities and terminal applications means coupled thereto to interact with the terminal capabilities and to execute thereby a terminal application is especially known in communication networks referred as a Universal Mobile Telecommunication Systems UMTS. For such an UMTS network the concept of Virtual Home environment is defined. A Virtual home environment is defined as a concept for personal service environment portability across network boundaries and between terminals. The concept of the Virtual Home environment is such that users are consistently presented with the same personalized features, User Interface customization and services in whatever network and whatever kind of terminal, wherever the user may be located. The Virtual Home Environment is seen as a key mechanism for convergence of fixed and mobile terminals, for public and private networks and operators and for telecommunication and data communication systems.

A terminal, either fixed terminal or mobile terminal, for use in such a virtual home environment comprises terminal capability means where for here below a non-exhaustive list of examples is provided:

a Wireless Application Protocol WAP client that communicates via a WAP gateway with a WEB server in the Internet or other terminals. WAP specifies an application framework and network protocols for wireless devices such as mobile phones, pagers and personal digital assistants. The network protocols specify a way of transporting data between an Internet Protocol IP network and mobile terminals. The application framework enables the creation of Internet like services; and a Wireless Telephone Application WTA client that communicates with a WTA server in the network. WTA specifies an application framework that extends the WAP architecture with telephony services. It is a collection of telephony specific extension for call and feature control mechanisms that make advanced Mobile Network Services available to users. In contrast with classical client-server architecture e.g. WAP where the client continuously communicates with the server for the execution of the services actually running on the server, WTA adopts a terminal centric approach. WTA services run in the WTA client on the mobile terminal, which only communicates with the WTA server for maintenance and reconfiguration reasons; and a Java execution environment such as e.g. a Java card. A JavaCard is a recent evolution in the area of smart-cards with an enhanced architecture that has a Java Card Virtual Machine JCVM on top of its native Operating System OS and allows to develop applications written in Java programming language; and a User Service Identity Module USIM module that comprises e.g. an authentication algorithm and a ciphering key, a card identification, a user identification, network and service related data and UMTS SIM applications i.e. USIM applications; and a SIM Application Tool-kit provides mechanisms which allow applications that exist on the USIM to interact and to operate with any part of the mobile equipment of a mobile terminal.

It has to be remarked that according to the virtual home environment definitions a User Service Identity Module that identifies a user can be comprised in as well a fixed terminal as a mobile terminal. Such a USIM card comprises terminal capability means but might as well comprise terminal applications means with a terminal application.

The above mentioned terminal capabilities are realizing terminal capability features whilst being supported by terminal bearers such as e.g. short message service SMS, circuit switched data and Generic Packet Radio Service. It has to be mentioned that a particular manufacturer develops these terminal capability features and terminal bearers. In this way the terminal capability features and terminal bearers are technology dependent according to the choices of a manufacturer.

The known kind of terminals further comprises a terminal application means to interact with one or more of the terminal capabilities in order to execute a terminal application.

A terminal application provides to a user of a terminal a particular service such as e.g. 'a call forwarding application according to the user's preferences' or 'a voice message application' or 'personal banking applications', etc. It has to be remarked that such a terminal application is a hardware module or, more commons, a software module. Such a software module terminal application is information e.g. logic and data that can be stored at production time on e.g. a read only memory of the terminal, but on the other hand, it might as well be downloaded from a service provider in the telecommunication network on e.g. an accessible memory of the terminal during operational use of the terminal. It has to be remarked that such a terminal application is usual designed according to a higher programming language level.

A terminal application means comprises at least part of the data concerning the present application and an application execution environment. In this way the execution environment, under the support of the associated terminal capability means, executes the data of the application e.g. a WAP application means executes a particular WAP application by interacting with the associated WAP client.

It has to be remarked here that since the terminal capability means is technology dependent according to a certain manufacturer, that also the related application is developed towards this technology of this manufacturer. Indeed, in order to be executed by the terminal application means that interacts with the terminal capability means the terminal application must be designed according to the same interfaces. This means that an application signal that is transmitted by the terminal capability means is received and understood by the terminal application means that executes an application being developed according to the same manufacturer preferences as the one used for the terminal capability means, and vice versa.

A problem outstanding with such kind of terminals is that in the event when a third party service provider develops a terminal application for use on a terminal, that the application must be written for different underlying technologies preferred and used by different manufacturers of terminals. Indeed, a terminal application developed according to preferences of a first manufacturer is not able to cooperate via the terminal application means with a terminal capability means being developed according to preferences of a second manufacturer.

Furthermore, two different terminal applications applied on a same terminal are not able to interact with each other when being designed for different kind of terminal capability means.

SUMMARY OF THE INVENTION

An object of the invention is to provide a terminal for use in a communication network that executes a terminal application such as the above known terminal but which has not the above mentioned drawback of the requirement of development of different terminal application designs for execution of a this terminal application by interacting with different terminal capability means of possible different manufacturer's underlying technology.

This is realized by a terminal (T) for use in a communication network, said terminal (T) comprising a plurality of terminal capability means (CAP1, CAP2, CAP3, CAP4) to realize a plurality of terminal capability features and coupled thereto a terminal application means (APP1; APP2; APP3; APP4) to interact with one or more of said plurality of terminal capability means (CAP1, CAP2, CAP3, CAP4) and to execute thereby a terminal application (app1; app2; app3; app4), wherein the terminal (T) further comprises at least one terminal capability server means (CS) coupled between said terminal application means (APP1; APP2; APP3; APP4) and to at least one of said plurality of terminal capability means (CAP1; CAP2; CAP3; CAP4), said terminal capability server means (CS) being adapted to translate a first application signal (S1) received from said at least one of said plurality of terminal capability means (CAP1; CAP2; CAP3; CAP4) into a first predefined application open signal (SO1) and to provide said first predefined application open signal (SO1) to said terminal application means (APP1; APP2; APP3; APP4) and also being adapted to translate a second predefined application open signal (SO2) received from said terminal application means (APP1; APP2; APP3; APP4) into a second application signal (S2) and to provide said second application signal (S2) to said at least one of said plurality of terminal capability means (CAP1; CAP2; CAP3; CAP4), said first predefined application open signal (SO1) and said second predefined application open signal (SO2) being independent of an underlying technology of said plurality of terminal capability means (CAP1; CAP2; CAP3; CAP4).

The invention is further directed to a terminal application (app1; app2; app3; app4) to be executed by a terminal application means (APP1; APP2; APP3; APP4) of a terminal (T) as described above, wherein the terminal application (app1; app2; app3; app4) is adapted to be executed according to received and transmitted open signals (SO1, SO2, ...) similar to any one of said first predefined application open signal (SO1) and said second predefined application open signal (SO2) and being independent of an underlying terminal technology of said plurality of terminal capability means (CAP1; CAP2; CAP3; CAP4).

The invention is further directed to a carrier for a terminal application (app1; app2; app3; app4), wherein the carrier is adapted to carry a terminal application (app1; app2; app3; app4) as described above.

The invention is still further directed to a method to execute a terminal application (app1; app2; app3; app4) by a terminal (T) comprising the step of realizing a plurality of terminal capability features by a plurality of terminal capability means (CAP1, CAP2, CAP3, CAP4), and interacting by a terminal application means (APP1; APP2; APP3; APP4) with at least one of said plurality of terminal capability means (CAP1; CAP2; CAP3; CAP4), and thereby executing by said terminal application means (APP1; APP2; APP3; APP4) a terminal application (app1; app2; app3; app4), wherein the method further comprises the steps of, by at least one terminal capability server means (CS):

translating a first application signal (S1) received from said at least one of said plurality of terminal capability means (CAP1; CAP2; CAP3; CAP4) into a first predefined application open signal (SO1), providing said first predefined application open signal (SO1) to said terminal application means (APP1; APP2; APP3; APP4), and translating a second predefined application open signal (SO2) received from said terminal application means (APP1; APP2; APP3; APP4) into a second application signal (S2), providing said second application signal (S2) to said at least one of said plurality of terminal capability means (CAP1; CAP2; CAP3; CAP4); and said first predefined application open signal (SO1) and said second predefined application open signal (SO2) being independent of an underlying technology of said plurality of terminal capability means (CAP1; CAP2; CAP3; CAP4).

Finally, the invention is directed to a communications network comprising at least one of a terminal (T), a terminal application (app1; app2; app3; app4) and a carrier, all as described above.

A further advantage of such kind of approach is the fact that one terminal application that is executed by a terminal application means can interact with different terminal capability means being developed with different underlying technologies such as e.g. a particular WAP application that interacts with a WAP client that is developed by one manufacturer and with another kind of terminal capability means such as a WTA client being developed by another manufacturer.

It has to be explained that the carrier described above can be realized by the terminal itself e.g. a memory element at the terminal application means, or by a third party service provider in order to be downloaded by a user or by a physical link between one of the network elements when e.g. being downloaded or just being transported.

A further feature, is that the first predefined open signal and the second predefined open signal are defined in correspondence to information of a predefined network open service architecture interface. This will become more clear in the following paragraph.

Such predefined network open service architecture interface is e.g. described by the third Generation Partnership Project, Technical Specification Group Services and System Aspects, Virtual Home environment/Open Service Architecture with reference 3G TS 23.127 version 1.0.0 and available for the public at by 650 Route des Lucioles—Sophia Antipolis, Valbonne—France and via the World Wide Web at http://www.3gpp.org and in October, 1999. This document describes an Open Service Architecture. It is mentioned that the Open Service Architecture OSA defines an architecture that enables operator and third party applications to make use of network functionality through an open standardized interface i.e. the OSA Interface. Open Service Architecture provides the glue between applications and service capabilities provided by the network. In this way applications become independent from the underlying network technology. The applications constitute the top level of the Open Service Architecture OSA. This level is connected to the Service Capability Servers via the Open Service Architecture interface. The Service Capability Servers map the Open Service Architecture interface onto the underlying telecom specific protocols and are therefore hiding the network complexity from the applications.

Applications can be network/server centric applications or terminal centric applications. Terminal centric applications reside in the terminal e.g. a Subscriber Identity Module SIM application toolkit application called shortly SAT application. Network/server centric applications are outside the core network and make use of service capability features offered through the Open Service Architecture. It has to be remarked that applications may belong to the network operator domain although running outside the core network. Outside the core network means that the applications are executed in Applications Servers that are physically separated from the network entities.

A third party service provider is with such an predefined network open service architecture enabled to write once a network application that makes use of network functionality according to an network independent way. Such a network application is e.g. a call conference application on a call conference application server as e.g. described in the above-mentioned document in Chapter 9, Annex—Example of use of GSA (informative). Herein, a user A desires to have a call conference with a user B and a user C. The network application requests the Camel Service Capability Server to set up a call according to the call forwarding preferences of user A. The call conference service settings of user A are known by e.g. interacting via the terminal of user A that comprises terminal capability means which are developed by different manufacturers. In this way, the third party service provider still needs to write different applications towards these different underlying technologies of different terminals. According to the example, the procedure of the call set up is ordered via a WAP communication. This WAP communication can be implemented by a WAP terminal application that interacts with a WAP client on the terminal of user A i.e. a terminal capability means of the terminal that communicates with a WAP server in the network. The WAP terminal application asks for instance via the terminal display to the user the different call conference parties upon which user A enters e.g. the user identification numbers of user B and user C and itself. The WAP terminal application is executed on the WAP terminal application means by interacting with the WAP terminal capability means, which is technology dependent. The present invention brings an improvement to such kind of service network applications which interact also with terminals by comprising the terminal capability server means CS in the terminal to translate the technology dependent application signals into technology independent open application signals. However, by defining the predefined application open signals in correspondence to information of such a predefined network open service architecture interface the flexibility towards the third party service providers is further improved. Indeed, since the network application is provided here by a third service provider, it is preferred that the user A takes contact, not with its home service provider of its home network, but directly with the service provider that the service provides. Therefor the application at the terminal of user A needs to know e.g. the identification information of this third party service provider which is defined according to the predefined network open service architecture. This is realized by a terminal as described above, wherein the first predefined application open signal (SO1) and second predefined application open signal (SO2) are defined in correspondence to a predefined network open service architecture interface information, and wherein the terminal application (app1; app2; app3; app4) comprises data in correspondence to the predefined network open service architecture interface. It has to be remarked that the above mentioned identification information is only cited as an example, and that the information of the present invention, in correspondence to a predefined network open service architecture interface, is not limited to only identification information of a third party service provider.

A final feature of he present invention is the fact that not only the interchanged signals between a terminal application means and a terminal capability means are terminal technology independent or are comprising information in accordance to a predefined network open service architecture interface information. It is also preferable that different terminal capability means are adapted to interact, either directly or indirectly via a terminal capability server means, according to predefined independent application open signals or according to signals comprising information of predefined network open service architecture. It has to be explained that as an example a SIM Application Tool-kit generates commands for the USIM of e.g. a mobile terminal, towards other parts of the mobile equipment. According to the present invention, such a command can comprise an identification reference of a terminal application on a terminal application means or an identification reference of a third party service provider in order to initiate e.g. a short message towards this third party service provider.

It should be noticed that the term 'comprising', used in the claims, should not be interpreted as being limitative to the means listed thereafter. Thus, the scope of the expression 'a device comprising A and B' should not be limited to devices consisting only of components A and B. It means that with respect to the present invention, the only relevant components of the device are A and B.

Similarly, it is to be noted that the term 'coupled', also used in the claims, should not be interpreted as being limitative to direct connections only. Thus, the scope of the expression 'a device A coupled to a device B' should not be limited to devices or systems wherein an output of device A is directly connected to an input of device B. It means that there exists a path between an output of A and an input of B which may be a path including other devices or means.

BRIEF DESCRIPTION OF THE DRAWING

The above and other objects and features of the invention will become more apparent and the invention itself will be best understood by referring to the following description of an embodiment taken in conjunction with the accompanying FIGURE that represents a telecommunication network in a virtual environment that comprises a terminal according to the present invention.

DETAILED DESCRIPTION OF THE INVENTION

Figure 1:
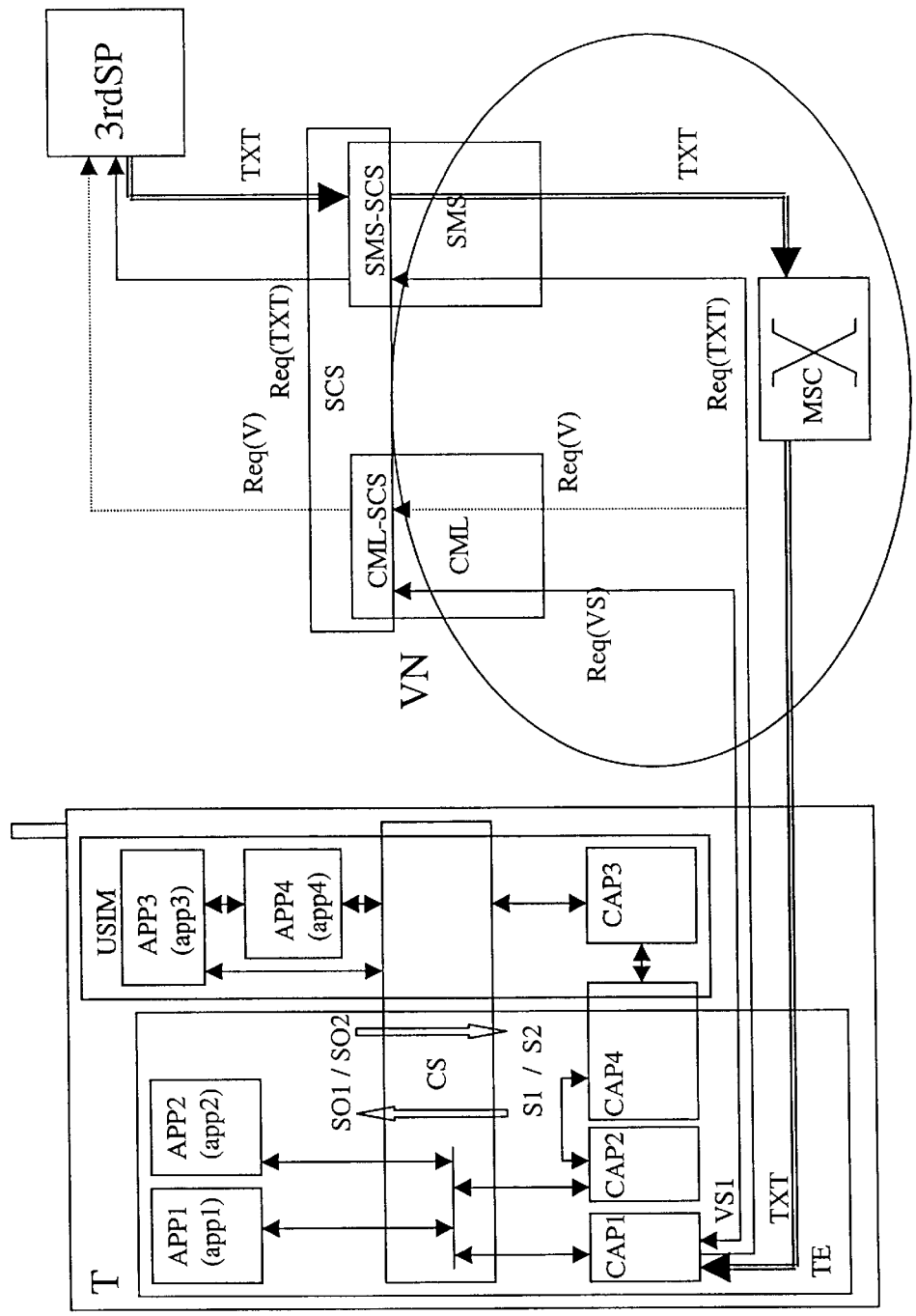

Referring to the FIGURE, the working of the terminal in accordance with the other network elements will be the working of the terminal in accordance with the other network elements will be explained by means of a functional description of the functional blocks shown therein. Based on this description, implementation of the functional blocks will be obvious to a person skilled in the art and will therefore not be described in detail. In additional, the principle working of the terminal regarding the invention will be described in further detail by means of three principle examples.

The communication network comprises a terminal T, a third party service provider 3rdSP and a visited mobile network VN. For this particular embodiment it is preferred to choose a mobile terminal. However, it has to be explained that the scope of the invention is not limited to mobile terminals and might be as well a fixed terminal. In order to explain the present invention by means of an example that is described in a later paragraph wherein the terminal is located in a visited i.e. not its home mobile network, a limited number of functional blocks of this visited mobile network will be shortly described.

The mobile network comprises, according to the definitions of the network open service architecture of the above mentioned document of 3GPP a service capability server SCS; a Customized Application for Mobile Network enhanced Logic Camel CML i.e. the required functionality to provide a mobile network a service of an intelligent network; a short message server SMS and a mobile switching center MSC. The service capability server SCS comprises a Camel service capability server CML-SCS on top of the Camel CML and a short message service capability server SMS-SCS on top of the short message server SMS.

It has to be remarked that these network elements are only mentioned in order to better explain the advantages of the present invention and that therefor these functional blocks are not described in further detail.

The terminal comprises four terminal capabilities CAP1, CAP 2, CAP3 and CAP4, four terminal application means APP1, APP2, APP3 and APP4 with four terminal applications app1, app2, app3 and app4, and one capability server CS.

It has to be understood that the applications app1, app2, app3 and app4, which are to be executed by the terminal application means, APP1, APP2, APP3 and APP4 are at least partly stored at the terminal application means, APP1, APP2, APP3 and APP4. How and when the applications are stored or eventual downloaded from the network goes beyond the scope of the invention. The aim is the fact that the logic and data, shortly called data information, concerning the execution of the applications is at least partly present at the application means and that this data information is to be used by the application means in order to provide a service to the user of the mobile terminal.

The terminal T comprises terminal equipment TE and an USIM.

The terminal equipment TE comprises as well terminal capabilities as terminal application means i.e. the terminal capabilities CAP1, CAP2, CAP4 and the terminal application means APP1 and APP2. The terminal equipment TE further comprises e.g. basic equipment of the mobile terminal to execute basic functionality for the mobile terminal such as e.g. setting up a communication.

The USIM is comprised to identify the user of the terminal and to personalize the terminal to this user. Furthermore by inserting the USIM in this terminal T the user informs the communication network the fact that he desires to communicate via this mobile terminal. The USIM comprises as well terminal capabilities CAP3 and CAP4 as two terminal application means APP3 and APP4.

It has to be remarked that in this way the terminal capabilities CAP4 is comprised in the USIM an in the terminal equipment TE. This will become more clear in a further paragraph wherein the terminal capabilities CAP is implemented with a SAT which indeed partly covers both functional blocks.

The four capabilities CAP2, CAP2, CAP3 and CAP4 are coupled via the capability server CS to one or more of the terminal application means APP1, APP2, APP3 and APP4. In this way APP2 is coupled via the capability server CS to capability CAP1 and capability CAP2.

It has to be remarked that the terminal capability server CS is preferred to be a centralized capability server. However, the terminal capability server CS can be distributed in the terminal towards the different terminal capabilities. In this way capability CAP 1 could have its own capability server and also capability CAP2 could have its own capability server. Furthermore, these two dedicated capability servers could on their turn be coupled to a centralized terminal capability server (not shown).

The terminal capability server CS is comprised to translate technology dependent application signals e.g. S1 received from one of the terminal capabilities CAP1, CAP2, CAP3 and CAP4 into technology independent open application signals e.g. SO1 and to provide these technology independent open application signals to one or more of the terminal application means APP1, APP2, APP3 and APP4. Further more the terminal capability server CS is comprised to translate technology independent open application signals e.g. SO2 received from one of the terminal applications means APP1, APP2, APP3 and APP4 into technology dependent application signals e.g. S2 and to provide these technology dependent application signals to one or more of the terminal capabilities CAP1, CAP2, CAP3 and CAP4. Since the terminal capability server CS is a centralized block it is preferred to show this translation in both directions by means of the two double arrows in the FIGURE. The technology independent open application signals are called predefined application open signals e.g. SO1 and SO2. It has to be remarked that the predefined terminal application open signals are predefined according to a cooperation between different manufacturers of different type of terminals, whereby functionality such as basic terminal functions but also functions regarding the terminal capabilities are determined and defined in a uniform way. The determined functions are translated into these predefined application open signals and vice versa.

Furthermore, for this particular embodiment it is preferred to further determine the predefined application open signals in accordance with the information of a predefined network open service architecture interface according to the above mentioned information of 3GPP. However, it has to be remarked that this accordance is elementary for the present invention. This will become more clearly in a further paragraph.

A first example that will be described to explain the principle working and the advantages of the present invention concerns an application based on a call forwarding application. Presume that the terminal capability CAP1 is a wireless telephone application WTA client capability that supports the terminal application app1 i.e. a wireless telephone application WTA. A first manufacturer develops the WTA terminal capability and also the WTA application. Presume that the terminal capability CAP2 is a short message terminal capability SMS that is developed by a second manufacturer. The terminal application means APP1 comprises in this way a call forwarding application app1. This means that the user is enabled to install its own call forwarding preferences and to forward received communications to another e.g. telephone number. Presume that a third party service provider wants to develop an application that provides a service similar to the call forwarding application but furthermore wants to provide to its user clients the extra service of automatically generating a short message to a predefined identification number. According to prior art terminals this third party service provider needs to contact the first manufacturer and the second manufacturer to gather the knowledge of the underlying technology for the terminal capabilities CAP1 and CAP2. However, according to the present invention the terminal T comprises the capability server CS to translate the technology dependent application signals such as S1 into predefined application open signals such as SO1. In this way, the third party service provider is enabled to develop the 'call forwarding with short message application' e.g. app2 without prior knowledge of the technology used by the first manufactures of the WTA terminal capability and the second manufacturer of the SMS terminal capability.

Even more, when the third party service provider wants to offer this service to a second user that uses a second terminal (not shown) with its installed WTA and SMS terminal capabilities of some other manufacturers, no redesign of the application is required as long that the terminal comprises a terminal capability server CS according to the present invention.

A second example that will be described to explain a further advantage of the present invention concerns the application on the USIM i.e. app3 and app4. Presume that the application app3 on the terminal application means APP3 provides a service to the user that relates to its banking account i.e. its overall expenses over a predetermined period. The service provider of the bank provides at regular time moments by means of a short message the expenses made during the actual month. The information is also stored in the application means APP3 for eventual later inquiry. Furthermore, presume that the application app4 on the terminal application means APP4 provides a service to the user that relates to its expenses at its food store over a predetermined period. The preferred service provider of the food store keeps track of the expenses of the clients which are desiring such a service and furthermore provides on a regular base the expenses made in the food store during the actual month. The information is also stored in the application means APP4 for eventual later inquiry. Although that both applications are located at the USIM and that both application means APP3 and APP4 are interacting with the terminal capability CAP3 on the USIM, according to prior art situations, both applications app3 and app4 being developed by different service providers are not aware of each other and the information concerning the other application. However, due to the presence of the terminal capability server CS according to the present invention and in particular that part of the terminal capability server for the USIM related terminal capabilities CAP3, the terminal application means APP3 and APP4 are interacting with capability CAP3 according to a uniform way that is transparent to the user. Hereby it is enabled to provide information from one USIM application to the other USIM application. Even a service provider that is different from the bank service provider and the food store service provider is enabled to develop in a technology independent way a further application that e.g. calculates the percentage of the food store expenses versus the overall expenses during the actual month (not shown).

Furthermore, the extra application can be improved by automatically sending a short message to a second user of the identical banking account in order to give this second user a warning when a predefined amount of expenses is reached by one or the other application. In the event when terminal capability CAP4 is a SAT functional block, upon request of the USIM, CAP4 commands the short message terminal capability means e.g. CAP 2 to generate automatically a short message towards the second user.

Even more, the application is further developed to additionally transmit a detailed list of the expenses, but only in the event when this second user is actually using a terminal with high display capabilities. Therefore, it is preferred to interrogate first, according to the extra application, the actual user profile of this second user by interacting with the home network capabilities. When, however this user profile network application is managed by a third party service provider outside the core network, it is necessary to inquiry this third party service provider and to known its identification references. Therefore the predefined application open signals are defined in accordance with a predefined network open service architecture information whereby e.g. this information can be requested to the network according to a standardized way.

The capabilities of the actual terminal (not shown) in use by the second user can be requested also directly to this terminal i.e. via the virtual home identification of the second user. Due to the presence of a capability server CS at this actual terminal of the second user the capabilities of this terminal are requested to the terminal directly in a way that is totally transparent for the second user himself.

The third example concerns a terminal application app1 i.e. a WTA application on terminal application means APP1 that provides the service of listening to voice messages. It explains however the interaction of a terminal according to the present invention with a network that supports open service architecture.

The terminal application means APP1 interacts with the terminal capability CAP1 i.e. a WTA client in order to execute the 'voice message application'. Presume that a third party service provider 3rdSP offers the application to the network of keeping track and storing voice messages. Herewith the 3rd service provider 3rdSP provides also the terminal application for the end-users of providing the voice messages upon request of the user. Furthermore, this 3rd party service provider wants to offer an extra service towards its users that are roaming in a visited network VN with a Camel version 1 VS1 that does not support interaction with a user using announcement voice prompting and information collection via in-band interaction. The extra service concerns the translation of the voice message into text TXT and the transmission of this text TXT message that is indeed supported by the Camel version 1 VS1. Now, when a user of the terminal T is roaming in a visited network VN and desires to listen to its voice messages, the user selects on the terminal the voice mail application app1. Furthermore, when the user wants to listen to one of its received voice messages, the application app1 interrogates, via the terminal capability server CS and under the support of the terminal capability CAP1 the installed Camel version VS of the visited network VN. This is shown with the request message Req(VS). Due to the accordance of the predefined application open signals, used by the terminal capability server CS, with the information of the 3GPP network open service architecture, the terminal is enabled to request the network for its Camel version. The visited network VN reacts by providing to the terminal is Camel version VS1, which is however too low and not adapted to request the 3rd service provider 3rdSP for the voice message. Upon reception of the Camel version VS1 by the terminal application means APP1, via the terminal capability CAP1 and the terminal capability server CS, the application app1 is further executed by the terminal application means APP1. In the event when the Camel version should have been a higher version e.g. Version 2 or Version 3, the terminal T could have asked, via the mobile network to the 3rd party service provider 3rd SP for transmission of the voice message. This is shown with a dotted line Req(V). However, due to the lower version V1, the application app1 requests for text transmission via the terminal capability server CS and the short message terminal capability CAP2, from the terminal T, via the mobile short message service functionality SMS and the short message service—network service capability server SMS-SCS to the third party service provider 3rdSP. This is shown with Req(TXT). Upon reception of this request the 3rdSP transforms the voice message into texts and transmits the text TXT to the terminal T via the mobile switching center MSC.

While the principles of the invention have been described above in connection with specific apparatus, it is to be clearly understood that this description is made only by way of example and not as a limitation on the scope of the invention, as defined in the appended claims.

What is claimed is:

1. A terminal for use in a communication network, said terminal comprising a plurality of terminal capability functions to realize a plurality of terminal capability features and coupled thereto a terminal application execution apparatus to interact with one or more of said plurality of terminal capability functions and to execute thereby a terminal application, characterized in that said terminal further comprises at least one terminal capability server coupled between said terminal application execution apparatus and to at least one of said plurality of terminal capability functions, said terminal capability server translating a first application signal received from said at least one of said plurality of terminal capability functions into a first predefined application open signal and providing said first predefined application open signal to said terminal application execution apparatus and also translating a second predefined application open signal received from said terminal application execution apparatus into a second application signal and providing said second application signal to said at least one of said plurality of terminal capability functions, said first predefined application open signal and said second predefined application open signal being independent of an underlying technology of said plurality of terminal capability function.

2. The terminal according to claim 1, characterized in that said first predefined application open signal and said second predefined application open signal are defined in correspondence to a predefined network open service architecture interface information.

3. The terminal according to claim 1, characterized in that at least two of said plurality of terminal capability functions are interacting with each other by means of capability signals comprising information in accordance with any one of said first predefined application open signal and said second predefined application open signal and a predefined network open service architecture interface information.

4. A terminal application to be executed by a terminal application execution apparatus of a terminal according to claim 1, characterized in that said terminal application is adapted to be executed according to received and transmitted open signals similar to any one of said first predefined application open signal and said second predefined application open signal and being independent of an underlying terminal technology of said plurality of terminal capability functions.

5. The terminal application according to claim 4, characterized in that said terminal application comprises data in correspondence to a predefined network open service architecture interface.

6. A carrier for a terminal application, characterized in that said carrier is adapted to carry a terminal application according to claim 4.

7. A method to execute a terminal application by a terminal comprising the step of realizing a plurality of terminal capability features by a plurality of terminal capability functions, and interacting by a terminal application execution apparatus with at least one of said plurality of terminal capability functions, and thereby executing by said terminal application execution apparatus a terminal application, characterized in that said method further comprises the steps of by at least one terminal capability server:

translating a first application signal received from said at least one of said plurality of terminal capability functions into a first predefined application open signal, providing said first predefined application open signal to said terminal application execution apparatus, translating a second predefined application open signal received from said terminal application execution apparatus into a second application signal, and providing said second application signal to said at least one of said plurality of terminal capability functions;

said first predefined application open signal and said second predefined application open signal being independent of an underlying technology of said plurality of terminal capability functions.

8. A communication network comprising at least one of a terminal according to claim 1, a terminal application to be executed by said terminal application execution apparatus, wherein said terminal application is adapted to be executed according to received and transmitted open signals similar to any one of said first predefined application open signal and said second predefined application open signal and being independent of an underlying terminal technology of said plurality of terminal capability functions, and a carrier for carrying said terminal application.

* * * * *